(12) United States Patent
Liu et al.

(10) Patent No.: US 11,158,887 B2
(45) Date of Patent: Oct. 26, 2021

(54) LARGE-CAPACITY SECONDARY BATTERY

(71) Applicant: National Engineering Research Center of Advanced Energy Storage Materials (Shenzhen) Co., Ltd, Shenzhen (CN)

(72) Inventors: Hongbing Liu, Shenzhen (CN); Faping Zhong, Shenzhen (CN); Pengfei Chen, Shenzhen (CN); Xiaofeng Chen, Shenzhen (CN); Yinglin Gong, Shenzhen (CN); Shunhua Hu, Shenzhen (CN)

(73) Assignee: NATIONAL ENGINEERING RESEARCH CENTER OF ADVANCED ENERGY STORAGE MATERIALS (SHENZHEN) CO., LTD, Shenzhen (CN)

( * ) Notice: Subject to any disclaimer, the term of this patent is extended or adjusted under 35 U.S.C. 154(b) by 64 days.

(21) Appl. No.: 16/742,339

(22) Filed: Jan. 14, 2020

(65) Prior Publication Data

US 2021/0013556 A1 Jan. 14, 2021

(30) Foreign Application Priority Data

Jul. 10, 2019 (CN) .......................... 201910617730.9

(51) Int. Cl.
  *H01M 10/42* (2006.01)
  *H01M 10/04* (2006.01)

(52) U.S. Cl.
  CPC ... *H01M 10/4257* (2013.01); *H01M 10/0422* (2013.01); *H01M 10/4264* (2013.01); *H01M 2010/4271* (2013.01); *H01M 2220/30* (2013.01)

(58) Field of Classification Search
  CPC ......... H01M 10/0422; H01M 10/0525; H01M 10/0565; H01M 10/0587; H01M 10/4257;
  (Continued)

(56) References Cited

U.S. PATENT DOCUMENTS

| 4,053,688 | A | * | 10/1977 | Perkins | ................. | G04G 17/02 |
| | | | | | | 429/98 |
| 2004/0170887 | A1 | * | 9/2004 | Masumoto | .......... | H01M 50/147 |
| | | | | | | 429/61 |
| 2020/0372788 | A1 | * | 11/2020 | Dimberg | ................ | H01H 23/12 |

FOREIGN PATENT DOCUMENTS

CN         105870519 A  *  8/2016   ............ H01M 10/42

OTHER PUBLICATIONS

Machine Translation CN105870519A (Year: 2016).*

* cited by examiner

*Primary Examiner* — Victoria H Lynch
(74) *Attorney, Agent, or Firm* — Muncy, Geissler, Olds & Lowe, P.C.

(57) ABSTRACT

The present invention provides a large-capacity secondary battery, including: a rechargeable cell, a steel shell, a protection IC, an integrated IC, resistors, capacitors, an inductor, an LED lamp, a plastic part, a circular rigid FR-4 substrate, a metal cap, an insulation pad and an insulation heat shrink film, for integrating multiple functions of a constant voltage output, charge management and protection, and overcharge, overdischarge and overcurrent protection. Compared with the prior art, the large-capacity secondary battery of the present invention can achieve multi-functional integration of the battery, and also can save the space occupied by accessory structural parts of the battery and achieve a large capacity of the battery.

7 Claims, 9 Drawing Sheets

(58) Field of Classification Search
CPC ............. H01M 10/4264; H01M 10/44; H01M 2010/4271; H01M 2200/00; H01M 2220/30; H01M 50/107; H01M 50/119; H01M 50/121; H01M 50/1245; H01M 50/152; H01M 50/157; H01M 50/16; H01M 50/162; H01M 50/164; H01M 50/184; H01M 50/193; H01M 50/528; H01M 50/531; H01M 50/559; H02J 7/00; Y02E 60/10

See application file for complete search history.

LARGE-CAPACITY SECONDARY BATTERY

FIELD OF THE INVENTION

The present invention relates to a large-capacity secondary battery, in particular to a large-capacity secondary battery that integrates multiple functions of a constant voltage output, charge management and charge protection, and battery protection (including overcharge protection, overdischarge protection, and overcurrent protection), and has a large capacity.

BACKGROUND OF THE INVENTION

Secondary batteries have the advantages of a large capacity and recyclability, and are applied more and more widely. For example, secondary lithium-ion batteries have become the main power supply batteries for mobile phones, notebook computers, cameras and portable mobile power packs, and in many traditional application fields of primary batteries such as for remote controls, flashlights, toys, etc., secondary lithium-ion batteries are gradually replacing the primary batteries.

However, compared with a primary battery, a secondary battery still has much inconvenience in use. The primary battery does not need to be charged, while the secondary battery needs to be charged with a dedicated charger, and to maintain normal performance, the secondary battery needs to manage and protect the charging process and the discharging use process. The rated voltage of the primary battery is different from that of the secondary battery. For example, the rated voltage of a lithium cobaltate-graphite type lithium-ion secondary battery is 3.7V, while the rated voltage of a general alkaline zinc-manganese dry battery is 1.5V. Thus, if voltage management is not performed on the secondary battery, generally it cannot be directly applied to an electrical device using the primary battery. Otherwise, the electrical device may be damaged.

To use a secondary battery in place of a primary battery, it often needs integrated assembly of a cell and accessory structural parts (generally including a circuit board, circuit components, a protective case, etc.) of the secondary battery, to finally form such a secondary battery that have various management and protection functions, with an output voltage meeting the requirement of a primary battery application, and overall outer structural dimensions and mechanical reliability of the battery meeting international standards. However, in the existing method for arranging accessory structural parts, usually a large amount of internal space of the battery is occupied thereby, so that it can only use a small-size low-capacity cell, which results in that the integrated secondary battery's capacity advantage is not obvious yet as compared with the primary battery.

Therefore, it has become very necessary to combine the performance characteristics of the secondary battery with the use requirements of the primary battery, overall optimize the charge management and protection of the secondary battery, the outer structure of the primary battery, and the use requirements of the primary battery, and minimize the space occupied by the accessory structural parts and leave more space for the cell to increase the capacity of the entire secondary battery, while taking into account the integration cost, efficiency and reliability.

SUMMARY OF THE INVENTION

A technical problem to be solved by the present invention is to overcome the above-mentioned drawbacks in the prior art and provide a large-capacity secondary battery. Compared with the prior art, the capacity of the large-capacity secondary battery of the present invention can be increased by about 10%, and can achieve a constant output voltage during the power output operation of the battery, and also has charge management and protection, discharge undervoltage protection, charge overvoltage protection, charge overcurrent protection, discharge overcurrent protection, and short circuit protection. This large-capacity secondary battery is very suitable for application scenarios where a rechargeable battery is used in place of a primary battery.

The present invention is achieved by the following solution:

A large-capacity secondary battery includes: a rechargeable cell, a steel shell, a protection IC, an integrated IC (integrating a charging function and a constant voltage output function), resistors, capacitors, an inductor, an LED lamp, a plastic part, a circular rigid FR-4 substrate, a metal cap, an insulation pad and an insulation heat shrink film, for integrating multiple functions of a constant voltage output, charge management and protection, and overcharge, overdischarge and overcurrent protection, wherein the protection IC, the integrated IC, the resistors, the capacitors, the inductor and the LED lamp are soldered on a side A of the circular rigid FR-4 substrate in a surface-mounted manner; the metal cap is soldered on a side B of the circular rigid FR-4 substrate; the insulation pad is sleeved on the metal cap; the circular rigid FR-4 substrate is mounted within the plastic part with the side B facing upward, and a first cylindrical body of the metal cap partially going beyond a top end of the plastic part, that is, a top surface of a first cylindrical tensile body of the plastic part; a lower end of the plastic part, that is, a third cylindrical tensile body of the plastic part, is sleeved at an open end of the steel shell in a mating manner; the rechargeable cell is placed inside the steel shell; a positive electrode terminal and a negative electrode terminal of the rechargeable cell are correspondingly connected to a first pad and a second pad of the side A of the circular rigid FR-4 substrate through a positive electrode lead wire and a negative electrode lead wire respectively; the insulation heat shrink film heat shrinks the insulation pad, the plastic part and the steel shell successively together; the circular rigid FR-4 substrate serves as a surface-mounted soldering substrate for the metal cap and other components, and also as an upper support end face and closure end face of the battery; the plastic part has three concentric cylindrical tensile bodies, to serve as a support body for the circular rigid FR-4 substrate, a transmission body for the LED lamp, an insulation protective body for surface-mounted soldered components on the side B of the circular rigid FR-4 substrate, and a structural body for connection and fixation to the steel shell; the function multiplex, three-dimensional space layout and assembly form of the three parts including the circular rigid FR-4 substrate, the plastic part and the insulation pad greatly reduce the space occupied by structural parts that do not contribute to the capacity, to achieve a large capacity.

The metal cap includes two cylindrical bodies, namely a first cylindrical body and a second cylindrical body, wherein the first cylindrical body has a diameter M1 and a height H1, an upper end surface of the first cylindrical body being a chamfered structure; the height H1 is a protruding height of the whole cap of the secondary battery; and the first cylindrical body is a structural part for the secondary battery to contact an external load or charging power source.

The second cylindrical body of the metal cap has a diameter M2 and a height H2; the second cylindrical body is coaxial with the first cylindrical body, and a top surface of the second cylindrical body is coplanar with a bottom surface of the first cylindrical body; M2<M1<GW, and 0.2 mm≤M2≤1 mm; and the height H2 satisfies: 0.5 mm≤H2<YH, wherein YH is the thickness of the circular rigid FR-4 substrate and GW is the outer diameter of the steel shell, both in mm. The setting of lower limit of M2, that is, 0.2 mm≤M2, can ensure the metal cap has certain strength and can well support a pressing contact force from the outside; and the setting of the upper limit of M2, that is, M2≤1 mm, can reduce an internal space of the battery occupied by the metal cap, thereby leaving more space for the side A of the circular rigid FR-4 substrate to arrange circuit components. The setting of the lower limit of the height H2, that is, 0.5 mm≤H2, allows a certain length of the metal cap to project into a corresponding center hole of the circular rigid FR-4 substrate, thereby enhancing the assembly firmness of the metal cap and the circular rigid FR-4 substrate, especially improving the anti-stripping ability of the metal cap under the action of a transverse shearing external force (such as when the battery is put into a battery compartment or a charger compartment, or when the battery is taken out from the battery compartment or the charger compartment); the setting of the upper limit of the height H2, that is, H2<YH, can ensure the second cylindrical body of the metal cap does not protrude to the side A of the circular rigid FR-4 substrate, thereby avoiding the second cylindrical body of the metal cap potentially interferes with the components (surface mounted on the side A of the circular rigid FR-4 substrate), thus being conducive to installation, surface-mounting, soldering and other operations.

The plastic part includes a first cylindrical tensile body, a second cylindrical tensile body and a third cylindrical tensile body, the first cylindrical tensile body, the second cylindrical tensile body and the third cylindrical tensile body being coaxial, the first cylindrical tensile body being connected with the second cylindrical tensile body in an up-down direction with outer walls thereof being flush with each other, and the top of the second cylindrical tensile body extending beyond an inner wall of the first cylindrical tensile body to form a support platform, and the third cylindrical tensile body being connected with the second cylindrical tensile body in the up-down direction with inner walls thereof being flush with each other. The first cylindrical tensile body has an outer diameter SD1, an inner diameter SD2 and a height SJ1; the second cylindrical tensile body has an inner diameter SD3 and a height SJ2, the outer diameter of the second cylindrical tensile body being the same as the outer diameter of the first cylindrical tensile body; and the third cylindrical tensile body has an outer diameter SD4 and a height SJ3, the inner diameter of the third cylindrical tensile body being the same as the inner diameter of the second cylindrical tensile body. The outer diameter SD1 of the first cylindrical tensile body of the plastic part is equal to the outer diameter GW of the steel shell; and the wall thickness SDB1 of the first cylindrical tensile body satisfies 0.5 mm≤SDB1≤1 mm, i.e. 1 mm≤SD1−SD2≤2 mm (if the thickness SDB1 is too small, the strength is not enough, so SDB1 is greater than or equal to 0.5 mm; and if the thickness SDB1 is too large, it occupies the space in the diameter direction of the battery, which can reduce the effective surface-mounted area of the circular rigid FR-4 substrate and is not conducive to the arrangement and surface-mounting of the components, so SDB1 is smaller than or equal to 1 mm). The height SJ1 of the first cylindrical tensile body of the plastic part is equal to the thickness YH of the circular rigid FR-4 substrate, that is, SJ1=YH, and the dimensional setting can achieve that after the circular rigid FR-substrate is mounted into the plastic part, the side B of the circular rigid FR-4 substrate is flush with the outer surface of the first cylindrical tensile body of the plastic part.

The inner diameter SD3 of the second cylindrical tensile body of the plastic part satisfies: 0.3 mm≤SD2−SD3≤2 mm. Due to SD2>SD3, a support platform can be formed at a joint part of the second cylindrical tensile body and the first cylindrical tensile body of the plastic part, and the support platform has two functions: firstly, supporting the circular rigid FR-4 substrate, and secondly, providing a plane to coat an adhesive, thereby bonding and fixing the circular rigid FR-4 substrate and the plastic part at the support platform. The upper limit of the inner diameter SD3 of the second cylindrical tensile body of the plastic part, that is, 0.3 mm≤SD2−SD3, is set in full consideration of the functional implementation of the support platform, which requires a certain support area, and if the area of the support platform is too small, the supporting force is insufficient and the adhesive force is also insufficient. The lower limit of the inner diameter SD3 of the second cylindrical tensile body of the plastic part, that is, SD2−SD3≤2 mm, is set in full consideration that if the area of the support platform is too large, the effective surface-mounted area of the side A of the circular rigid FR-4 substrate can be greatly reduced, which is not conducive to the arrangement and surface-mounting of the components. The height SJ2 of the second cylindrical tensile body of the plastic part satisfies: HD/2≤SJ2≤1 mm, wherein HD is the height of the surface-mounted LED lamp, in mm. The setting of the lower limit of the height of the second cylindrical tensile body of the plastic part, that is, HD/2≤SJ2, can achieve that light of the LED lamp can be transmitted through the wall surface of the second cylindrical tensile body of the plastic part, and if the height SJ2 is too small, the transmission effect of the light of the LED lamp is not good. The upper limit of the height of the second cylindrical tensile body of the plastic part, that is, SJ2≤1 mm, is set in full consideration of saving the space required for parts that do not contribute to the capacity, and minimizing the height space of the battery occupied by the plastic part, thereby leaving the saved height space to the cell, which is conducive to a large capacity of the battery.

The outer diameter SD4 of the third cylindrical tensile body of the plastic part is equal to the inner diameter GN of the steel shell, that is, SD4=GN. The height SJ3 of the third cylindrical tensile body of the plastic part satisfies: 1.5 mm≤SJ3, and YJmax≤SJ3≤YJmax+1 mm, wherein YJmax is the maximum height of the surface-mounted components on the side A of the circular rigid FR-4 substrate, in mm. 1.5 mm≤SJ3 is set to meet the requirement that the third cylindrical tensile body of the plastic part projects into the steel shell, and the adhesive is applied to a joint part of the third cylindrical tensile body of the plastic part in the height direction and the steel shell to bond and fix them, or the steel shell is punched with a recess and embedded in the joint part of the third cylindrical tensile body of the plastic part in the height direction and the steel shell to implement fixation, and if SJ3 is too small, then the adhesive force at the joint part is insufficient or the punched recess is difficult to operate, thereby causing weak fixation. The limitation of YJmax≤SJ3 achieves that all the components on the side A of the circular rigid FR-4 substrate are accommodated inside the third cylindrical tensile body of the plastic part, thereby avoiding the short circuit risk caused by contact between the components on the side A of the circular rigid FR-4 substrate and the inner wall surface of the steel shell, which is beneficial to the improvement of reliability. SJ3≤YJmax+1 mm is set in full consideration of saving the space required for parts that do not contribute to the capacity, and minimizing the height space of the battery occupied by the plastic part, thereby leaving the saved height space to the cell, which is conducive to a large capacity of the battery.

The overall contour of the circular rigid FR-4 substrate is a circular tensile body (with a radius of YB and a thickness of YH), and it is provided with a center hole having a diameter d1. The radius of the circular rigid FR-4 substrate satisfies:

$$\frac{SD2}{2} - 0.1 \text{ mm} \le YB \le \frac{SD2}{2} \text{mm};$$

the dimensional setting can well achieve that the circular rigid FR-4 substrate is mounted inside the first cylindrical tensile body of the plastic part, and is supported by the support platform formed at the joint part of the second cylindrical tensile body and the first cylindrical tensile body of the plastic part; if YB is too small, the diameter of the circular rigid FR-4 substrate is too small so that the circular rigid FR-4 substrate cannot well support the support platform formed at the joint part of the second cylindrical tensile body and the first cylindrical tensile body of the plastic part; and if the YB is too large, that is, $$YB > \frac{SD2}{2},$$

the diameter of the circular rigid FR-4 substrate is too large a diameter so that the circular rigid FR-4 substrate cannot be mounted inside the first cylindrical tensile body of the plastic part. The center hole of the circular rigid FR-4 substrate satisfies: M2<d1≤1 mm; the setting of the dimensional lower limit, that is, M2<d1, can well achieve the second cylindrical body of the metal cap can be inserted into the center hole of the circular rigid FR-4 substrate to accomplish assembly; and the setting of the dimensional upper limit, that is, d1≤1 mm, also allows the side A of the circular rigid FR-4 substrate to have more space for arrangement and surface mounting. The thickness of the circular rigid FR-4 substrate satisfies 0.4 mm≤YH≤1 mm; if the thickness is too small, the strength of the circular rigid FR-4 substrate is insufficient, causing severe deformation or even breaking of the circular rigid FR-4 substrate when the metal cap is subjected to a contact pressure; and if the thickness is too large, the circular rigid FR-4 substrate occupies more height space of the battery, which is not conducive to saving more height space to the cell, and thereby not conducive to a large capacity of the battery.

The overall shape of the insulation pad is circular, with a circular hole formed at the center, the insulation pad having a diameter of MD1 and a thickness of MDH, wherein the diameter of the circular hole is MX. The insulation pad is made of an insulating material such as PET or PVC or Highland Barley paper. The insulation pad is sleeved on the first cylindrical body of the metal cap via the central circular hole, and covers the side B of the circular rigid FR-4 substrate. The surface of the insulation pad in contact with the side B of the circular rigid FR-4 substrate B may be applied with an adhesive sticker in advance to achieve better adhesion and fixation to the side B of the circular rigid FR-4 substrate. The function of the insulation pad is to serve as an insulating and protective layer for the side B of the circular rigid FR-4 substrate, thereby avoiding possible damage of a solder mask layer, exposure of a copper foil, electrical leakage, a short circuit and the like due to scratching of the side B of the circular rigid FR-4 substrate by an external object. The thickness of the insulation pad satisfies: 0.1 mm≤MDH≤0.3 mm; if the thickness of the insulation pad is too small, the insulation pad has poor friction or tension resistance, and thus is susceptible to damage, and the insulating and protective layer cannot be well achieved; and if the thickness of the insulation pad is too large, the insulation pad occupies more height space of the battery, which is not conducive to a large capacity of the battery. The diameter of the insulation pad satisfies: 2×YB<MD1≤SD1, to ensure that the insulation pad can fully cover the side B of the circular rigid FR-4 substrate. The diameter of the circular hole of the insulation pad satisfies: M1<MX≤M1+0.2 mm, wherein the setting of M1<MX can achieve that the first cylindrical body of the metal cap can completely pass through the circular hole of the insulation pad without interference, and the setting of MX≤M1+0.2 mm further ensures that the insulation pad fully covers the side B of the circular rigid FR-4 substrate B substrate.

The insulation heat shrink film is an insulating film which shrinks by heat, is made of PVC or PET, and has the function that being wrapped around the outer side of the steel shell, it gets stuck to the steel shell after shrinking, thus achieving insulation and fixing the insulation pad. Key feature dimensions of the insulation heat shrink film include a thickness RH, an upper wrapping diameter RS, and a lower wrapping diameter RX of the insulation heat shrink film. The thickness RH of the insulation heat shrink film satisfies 0.05 mm≤RH≤0.2 mm; if the thickness is too small, it is susceptible to damage, and its functions of insulation and fixing the insulation pad cannot be well achieved; and if the thickness of the insulation heat shrink film is too large, the total diameter of the battery exceeds the standard specification. The upper wrapping diameter RS of the insulation heat shrink film satisfies: MD1−6.0 mm≤RS≤MD1−0.5 mm; the setting of RS≤MD1−0.5 can achieve effective wrapping and fixing of the insulation pad by the insulation heat shrink film; and MD1−6.0 mm≤RS takes into account that if too much is wrapped when the insulation heat shrink film heat shrinks actually, the heat shrink is prone to be irregular. The lower wrapping diameter RX of the insulation heat shrink film satisfies: GW−5.0 mm≤RX≤GWmm, and the setting of RX≤GW can achieve effective wrapping of the lateral side of the steel shell of the battery by the insulation heat shrink film; GW−5.0 mm≤RX takes into account that if too much is wrapped when the insulation heat shrink film heat shrinks actually, the heat shrink is prone to be irregular, and this is also not conducive to contact between the bottom of the steel shell and an external electrical appliance or terminal.

The circular rigid FR-4 substrate is a double-sided board, wherein totally ten components are soldered on the side A, including an integrated IC (integrating a charge function, a charge protection function and a constant voltage output function), a first resistor, a second resistor, a third resistor, an inductor, an LED lamp, a protection IC (including charge overvoltage protection, charge overcurrent protection, discharge undervoltage protection, discharge overcurrent protection, charge or discharge overtemperature protection, and short circuit protection), a first capacitor, a second capacitor, and a third capacitor, and the side A is also provided with a first pad and a second pad; and a metal cap is soldered on the side B. The circular rigid FR-4 substrate with the components welded thereon is called a circular PCB.

The maximum height DXGmax of the rechargeable cell satisfies: DXGmax≤H−H1−SJ1−SJ2−SJ3−GKDH, wherein H is the total height of the secondary battery, H1 is the height of the first cylindrical body of the metal cap, SJ1 is the height of the first cylindrical tensile body of the plastic part, SJ2 is the height of the second cylindrical tensile body of the plastic part, SJ3 is the height of the third cylindrical tensile body of the plastic part, and GKDH is the thickness of the bottom of the steel shell including the bottom boss.

The large-capacity secondary battery is implemented as follows:

Firstly, an adhesive is applied to a support platform formed at a joint part of a second cylindrical tensile body and a first cylindrical tensile body of a plastic part, and to the inner wall in the height direction of the first cylindrical tensile body of the plastic part, and a circular PCB (components are first soldered to a side A of a circular rigid FR-4 substrate in a surface-mounted manner, and a second cylindrical body of the metal cap is inserted into a center hole of the circular rigid FR-4 substrate and soldered to the side B of the circular rigid FR-4 substrate, wherein the circular rigid FR-4 substrate with the components soldered thereon in a surface-mounted manner is called a circular PCB) is mounted inside the first cylindrical tensile body of the plastic part with the side A facing downward and the side B facing upward, and is press-fit to the support platform, and after the adhesive is cured, the circular PCB is bonded and fixed to the plastic part.

Secondly, a positive electrode lead wire (which may be a nickel strip, a nickel-plated steel strip, or a conducting wire) can be welded at a positive terminal of a rechargeable cell, and a negative electrode lead wire (which may be a nickel strip or a nickel-plated steel strip) can be welded at a negative terminal of the rechargeable cell, and then the rechargeable cell can be placed into a steel shell, and the negative electrode lead wire of the rechargeable cell is electrically connected to the steel shell (by soldering, press-fitting, electric resistance welding, laser welding, or the like).

Thirdly, the positive electrode lead wire of the rechargeable cell is connected to a first pad of the side A of the circular rigid FR-4 substrate (if the positive electrode lead wire of the rechargeable cell is a conducting wire or a nickel strip or a nickel-plated steel strip, soldering connection can be adopted; and if the positive electrode lead wire of the rechargeable cell is a nickel strip or a nickel-plated steel strip, it is also possible that a nickel sheet or a nickel-plated steel sheet is surface mounted to the first pad on the side A of the circular rigid FR-4 substrate, and then, the positive electrode lead wire of the rechargeable cell is connected to the first pad of the side A of the circular rigid FR-4 substrate by resistance welding or laser welding); and the negative electrode lead wire of the rechargeable cell is connected to a second pad on the side A of the circular rigid FR-4 substrate, in which soldering connection can be adopted, and it is also possible that a nickel sheet or a nickel-plated steel sheet is surface mounted to the second pad on the side A of the circular rigid FR-4 substrate, and then, the negative electrode lead wire of the rechargeable cell is connected to the second pad of the side A of the circular rigid FR-4 substrate by resistance welding or laser welding.

Fourthly, a third cylindrical tensile body of the plastic part is inserted into the steel shell, and then a joint part of the third cylindrical tensile body and the steel shell of the plastic part and the steel shell is punched by a steel pin, and the steel shell is deformed under force and embedded into the third cylindrical tensile body of the plastic part, thus achieving fixation of the plastic part and the steel shell; or an adhesive is applied to the inner wall surface of the steel shell at a joint part of the third cylindrical tensile body of the plastic part and the steel shell, and then, the third cylindrical tensile body of the plastic part is inserted into the steel shell, and the adhesive is cured to accomplish the bonding and fixing of the plastic part and the steel shell.

Fifthly, a circular hole of an insulation pad is sleeved on a first cylindrical body of the metal cap, and the insulation pad is adhered to the side B of the circular rigid FR-4 substrate, and finally an insulation heat shrink film heat shrinks the insulation pad, the plastic part and the steel shell successively together, thus accomplishing the fabrication of the large-capacity secondary battery.

Compared with the prior art, the large-capacity secondary battery of the present invention has the following advantages:

(1) The space occupied by accessory structural parts of the battery can be saved and a large capacity of the battery can be achieved. The plastic part integrates multiple functions of accommodation and support, insulation and protection, and light transmission for the circular rigid FR-4 substrate, and fixation for the steel shell structure, etc.; the two cylindrical bodies with different diameters of the metal cap not only function as output terminals of the battery to contact an external load, but also have the function of connecting the circular rigid FR-4 substrate, while taking into account reasonable distribution and balance among the current path, structural strength and the space occupation; and the insulation pad has an insulating function and also serves to protect the circular rigid FR-4 substrate. The minimization of the space occupied by accessory parts of the battery has the direct effect that a cell with a larger size and a larger capacity can be adopted, which is advantageous for achieving a large capacity of the battery.

(2) Multi-functional integration can be achieved. The secondary battery integrates the functions of a constant voltage output, charge management and protection, and overcharge, overdischarge and overcurrent protection, so an ordinary 5V mobile phone charger and a matched charge compartment can be used conveniently for charging, and a dedicated battery charger is not needed.

(3) The secondary battery can meet the requirements of the international standard structural dimensions and mechanical reliability. In the case of the large-capacity secondary battery of the present invention, a creative structural layout and spatial planning is carried out on components or parts such as the rechargeable cell, the steel shell, the protection IC, the integrated IC (integrating a charging function and a constant voltage output function), the resistors, the capacitors, the inductor, the plastic part, the circular rigid FR-4 substrate, the metal cap, the insulation pad, and the insulation heat shrink film, etc., in full consideration of the reliability of the connections among the various parts, and further taking into account the achievability and convenience of assembling, welding or other operations. In this way, the integrated secondary battery can save the space occupied by accessory parts of the battery and achieves a large capacity of the battery, and the secondary battery can also meet the requirements of international standard structural dimensions and mechanical reliability (such as mechanical vibration, fall, etc.).

The large-capacity secondary battery of the present invention is novel in structure and simple in fabrication. The large-capacity secondary battery of the present invention meets the requirements of multi-functional integration, structural reliability, and process operability, and the large-capacity secondary battery of the present invention can achieve a capacity increase of about 10% as compared with the prior art.

BRIEF DESCRIPTION OF THE DRAWINGS

FIG. 3 B is a schematic diagram of key feature dimensions of the metal cap in embodiment 1;

FIG. 4 B is a schematic diagram of key feature dimensions of the plastic part in embodiment 1;

FIG. 6 B is a schematic diagram of a 3D structure and key feature dimensions of an insulation heat shrink film in embodiment 1;

DETAILED DESCRIPTION OF THE EMBODIMENTS

The present invention is further described in detail below in conjunction with the accompanying drawings and embodiments.

Embodiment 1

Using an example of manufacturing a cylindrical large-capacity secondary battery with a constant voltage output, implementations of the structure and function of the cylindrical large-capacity secondary battery are further set forth, and a method for implementing the large capacity of the secondary battery is described.

Figure 1:
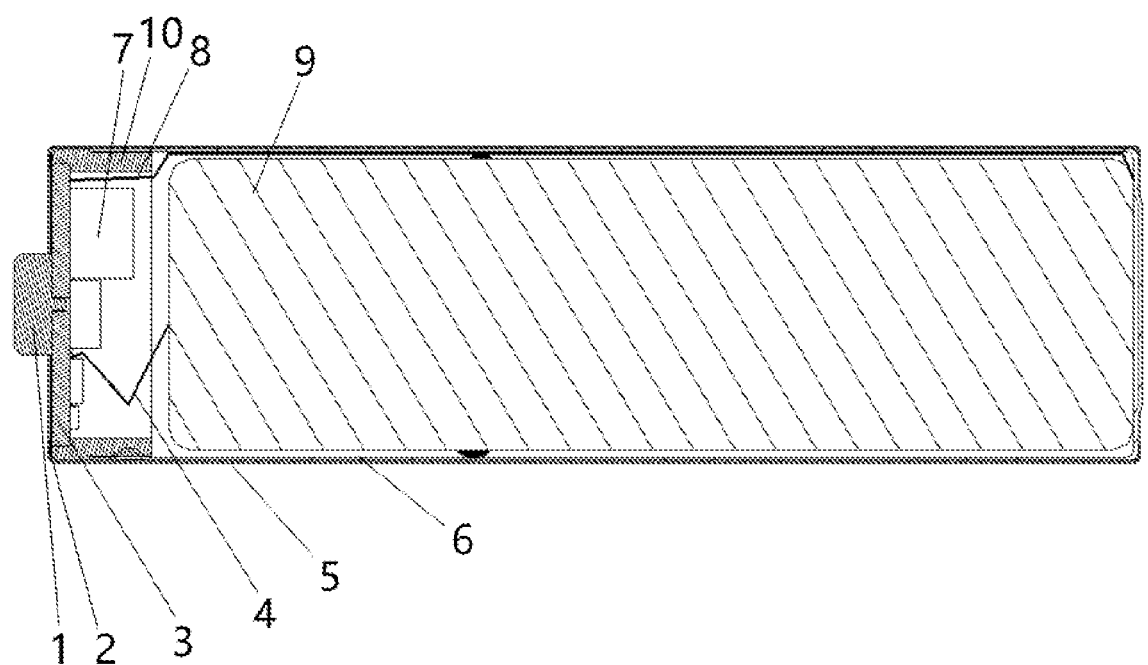
FIG. 1 is an overall sectional diagram of a large-capacity secondary battery in embodiment 1.
Figure 2:
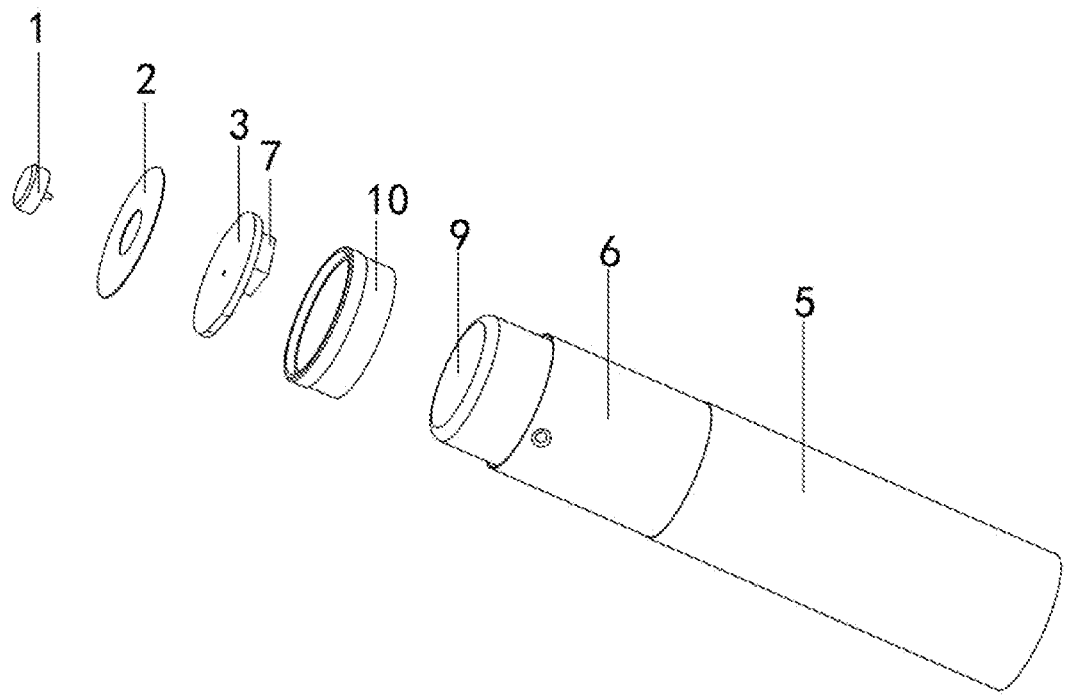
FIG. 2 is an exploded diagram of the large-capacity secondary battery in embodiment 1.

A large-capacity secondary battery is cylindrical (its overall outer dimensions need to meet the requirements of dimension specifications of the model R6S required by the standard in IEC60086-2:2011, MOD), and as required, the battery has a diameter smaller than or equal to 14.5 mm, and a height H smaller than or equal to 50.5 mm; the battery has a charge management function; and has charge protection and discharge protection functions; and the battery has a constant voltage of 1.50V±0.10V, and a persistent 1.0 A current output function. As shown in FIGS. 1 and 2, the large-capacity secondary battery includes a rechargeable cell 9, a steel shell 6, components 7 (including resistors, capacitors, an inductor, an LED lamp, etc.), a plastic part 10, a circular rigid FR-4 substrate 3, a metal cap 1, an insulation pad 2, an insulation heat shrink film 5, a negative electrode lead wire 4, and a positive electrode lead wire 8, wherein the rechargeable cell 9 of the embodiment is a polymer lithium-ion unit cell of the model 13450 (with a diameter of 13.00±0.20 mm, and a height of 45.00+0-1.0 mm), a nominal voltage of 3.7V, and a capacity of 850 mAh; the steel shell 6 serves as a battery case, with an outer diameter GW=13.90±0.05 mm, an inner diameter GN=13.50±0.05 mm, a height of 47.80±0.05 mm, and a bottom thickness GKDH of 0.5 mm (including the height of a bottom boss); the rechargeable cell 9 is placed inside the steel shell 6; a third cylindrical tensile body of the plastic part 10 is inserted into an open end of the steel shell 6 in a mating manner and cooperates therewith; the steel shell 6 is punched with a recess for embedded fixation to the plastic part 10; the components 7 are soldered to a side A of the circular rigid FR-4 substrate 3 in a surface-mounted manner; the metal cap 1 is soldered to a side B of the circular rigid FR-4 substrate 3; the insulation pad 2 is sleeved on the metal cap 1; the circular rigid FR-4 substrate 3 is mounted within the plastic part 10 with the side B facing upward, and a first cylindrical portion of the metal cap 1 extending beyond a top end of the plastic part 10, that is, a top end of the first cylindrical tensile body of the plastic part 10; a positive electrode terminal and a negative electrode terminal of the rechargeable cell 9 are correspondingly connected to a first pad and a second pad of the side A of the circular rigid FR-4 substrate 3 through a positive electrode lead wire 8 and a negative electrode lead wire 4 respectively; and the insulation heat shrink film 5 heat shrinks the insulation pad 2, the plastic part 10 and the steel shell 6 successively together.

Figure 3:
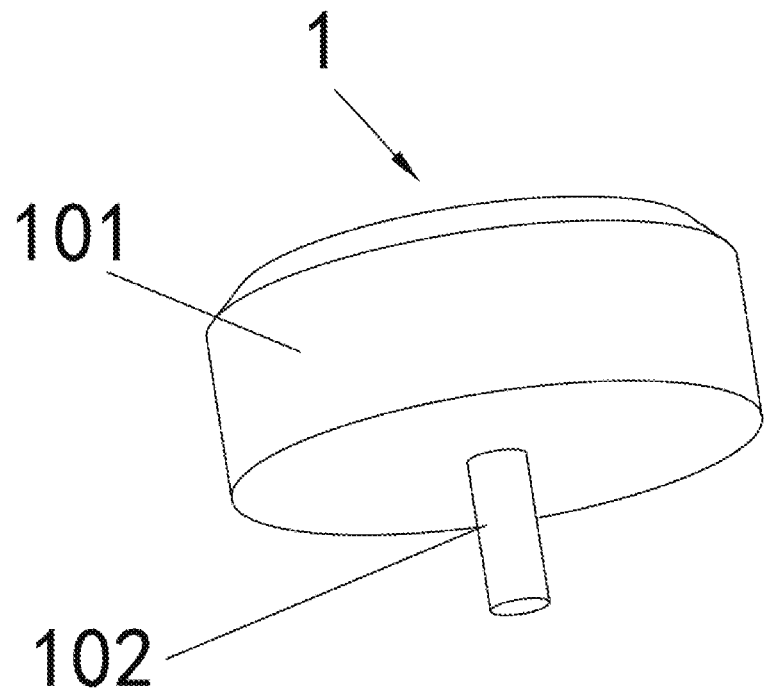
FIG. 3 A is a 3D structure diagram of a metal cap in embodiment 1.
Figure 3:
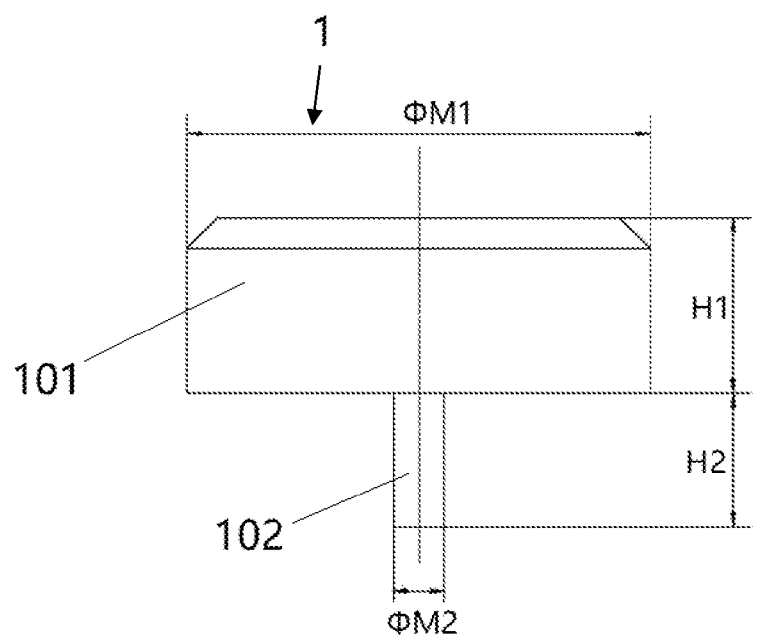

As shown in FIG. 3 A, the metal cap 1 includes a first cylindrical body 101 and a second cylindrical body 102, an upper end surface of the first cylindrical body 101 being a chamfered structure, and the first cylindrical body 101 being a structural part for the secondary battery to contact an external load or charging power source; and the second cylindrical body 102 being coaxial with the first cylindrical body 101, and a top surface of the second cylindrical body 102 being coplanar with a bottom surface of the first cylindrical body 101. FIG. 3 B shows key feature dimensions of the metal cap, wherein the diameter and height of the first cylindrical body 101 are M1 and H1, respectively, and the diameter and height of the second cylindrical body 102 are M2 and H2, respectively. In embodiment 1, the aforementioned key feature dimensions of the metal cap are set as follows: M1=4.50±0.05 mm, H1=1.70±0.05 mm, M2=0.50±0.05 mm, and H2=0.50±0.05 mm.

Figure 4:
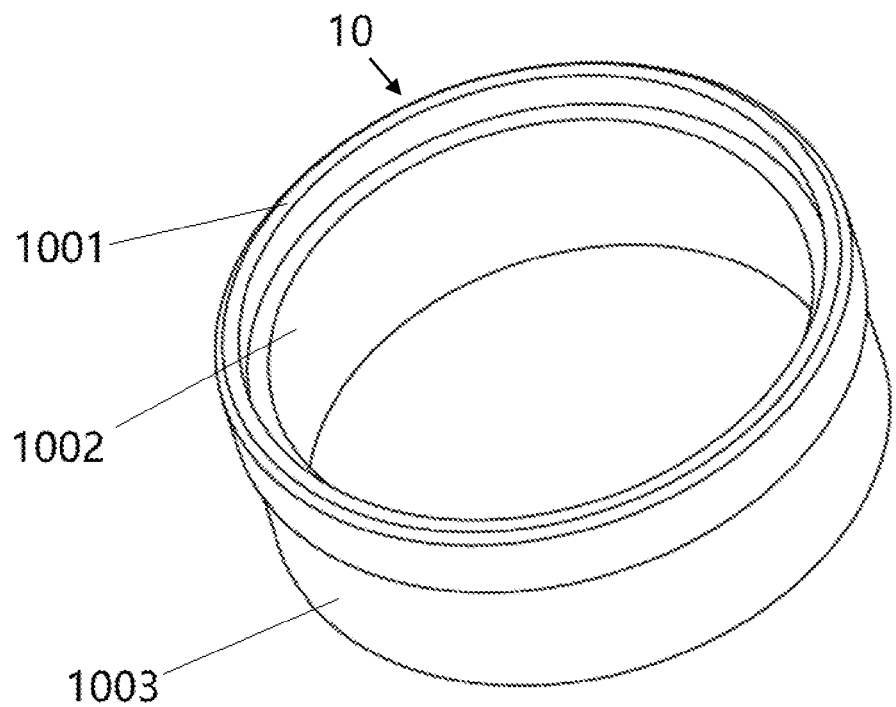
FIG. 4 A is a 3D structure diagram of a plastic part in embodiment 1.
Figure 4:
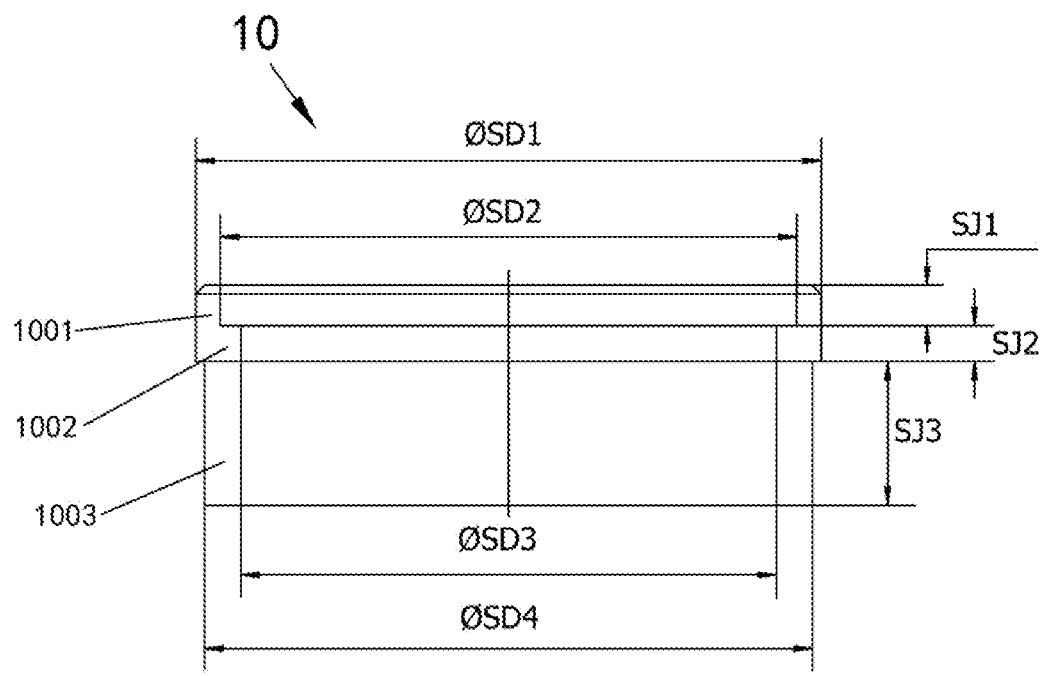

As shown in FIGS. 4 A and 4 B, the plastic part 10 includes a first cylindrical tensile body 1001, a second cylindrical tensile body 1002 and a third cylindrical tensile body 1003, the first cylindrical tensile body 1001, the second cylindrical tensile body 1002 and the third cylindrical tensile body 1003 being coaxial, the first cylindrical tensile body 1001 being connected with the second cylindrical tensile body 1002 in an up-down direction with outer walls thereof being flush with each other, and the top of the second cylindrical tensile body 1002 extending beyond an inner wall of the first cylindrical tensile body 1001 to form a support platform, and the third cylindrical tensile body 1003 being connected with the second cylindrical tensile body 1002 in the up-down direction with inner walls thereof being flush with each other. FIG. 4 C shows key feature dimensions of the plastic part, wherein the first cylindrical tensile body has an outer diameter SD1, an inner diameter SD2 and a height SJ1; the second cylindrical tensile body has an inner diameter SD3 and a height SJ2, the outer diameter of the second cylindrical tensile body being the same as the outer diameter of the first cylindrical tensile body; and the third cylindrical tensile body has an outer diameter SD4 and a height SJ3, the inner diameter of the third cylindrical tensile body being the same as the inner diameter of the second cylindrical tensile body. In embodiment 1, the aforementioned key feature dimensions of the plastic part are set as follows: SD1=13.9±0.05 mm, SJ1=0.70±0.05 mm, SD2=12.8±0.05 mm, SD3=11.9±0.05 mm, SJ2=0.30±0.05 mm, SD4=13.5±0.05 mm, and SJ3=2.00±0.05 mm.

Figure 5:
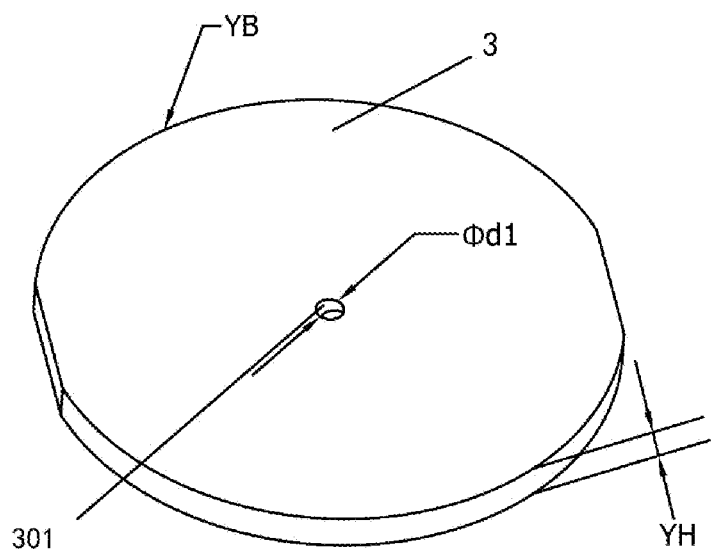
FIG. 5 is a schematic diagram of a 3D structure and key feature dimensions of a circular rigid FR-4 substrate in embodiment 1.

As shown in FIG. 5, the overall contour of the circular rigid FR-4 substrate 3 is a circular tensile body (with a radius of YB and a thickness of YH), and it is provided with a center hole 301 having a diameter d1. In embodiment 1, the aforementioned key feature dimensions of the circular rigid FR-4 substrate are set as follows: YB=6.30 mm±0.05, YH=0.70±0.05 mm, and d1=0.60±0.05 mm.

Figure 6:
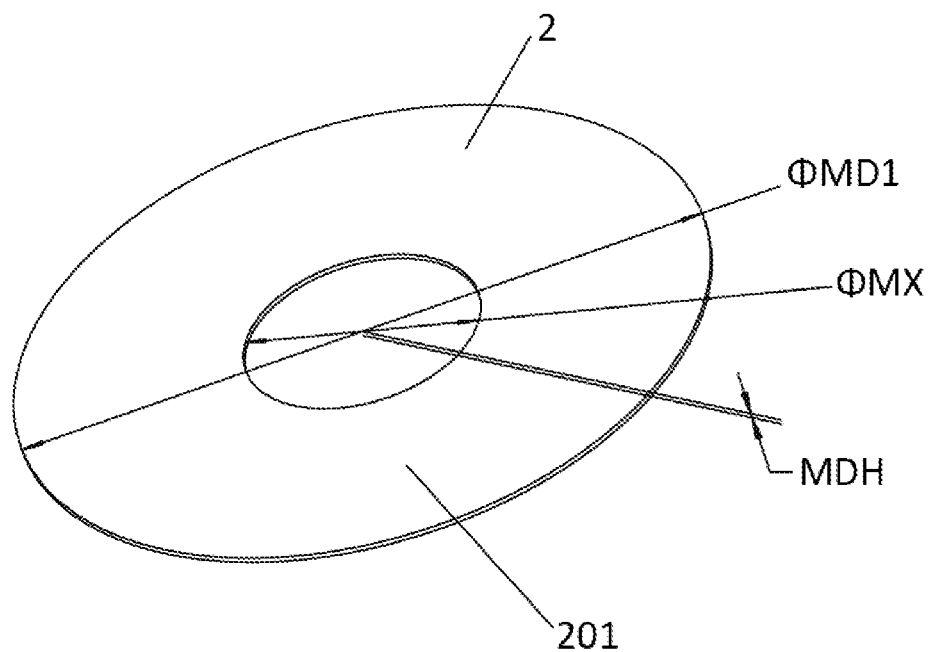
FIG. 6 A is a schematic diagram of a 3D structure and key feature dimensions of an insulation pad in embodiment 1.
Figure 6:
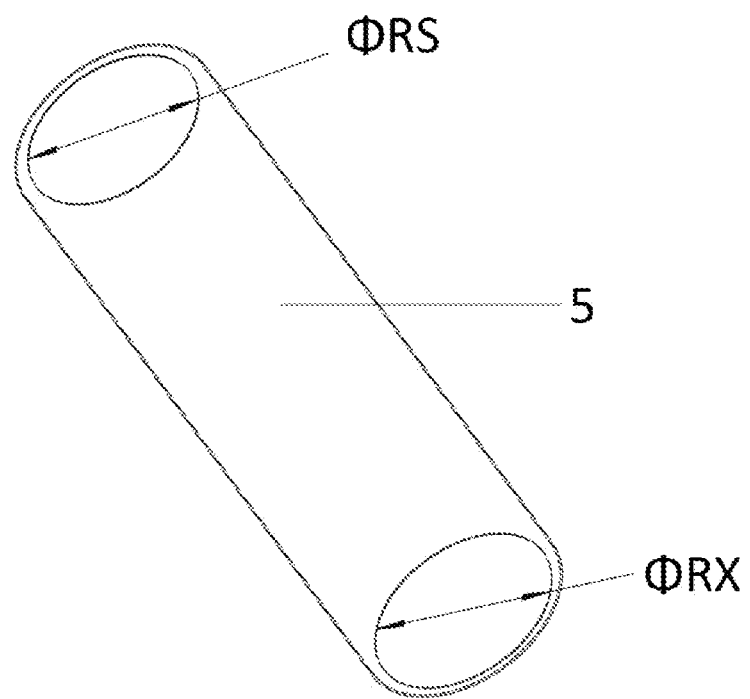

As shown in FIG. 6A, the overall shape of the insulation pad 2 is circular, with a circular hole 201 formed at the center, the insulation pad having a diameter of MD1 and a thickness of MDH, wherein the diameter of the circular hole is MX. The function of the insulation pad is to serve as an insulating and protective layer for the side B of the circular rigid FR-4 substrate, thereby avoiding possible damage of a solder mask layer, exposure of a copper foil, electrical leakage, a short circuit and the like due to scratching of the side B of the circular rigid FR-4 substrate by an external object. In embodiment 1, the aforementioned key feature dimensions of the insulation pad are set as follows: MD1=13.50 mm±0.05, MDH=0.15±0.05 mm, and MX=4.60±0.05 mm.

As shown in FIG. 6B, the insulation heat shrink film 5 is an insulating film which shrinks by heat, is made of PVC or PET, and has the function that being wrapped around the outer side of the steel shell, it gets stuck to the steel shell after shrinking, thus achieving insulation and fixing the insulation pad. Key feature dimensions of the insulation heat shrink film include a thickness RH, an upper wrapping diameter RS, and a lower wrapping diameter RX of the insulation heat shrink film. In embodiment 1, the aforementioned key feature dimensions of the insulation pad are set as follows: RS=10.50 mm±0.05, RH=0.10±0.05 mm, and RX=11.90±0.05 mm.

Figure 7:
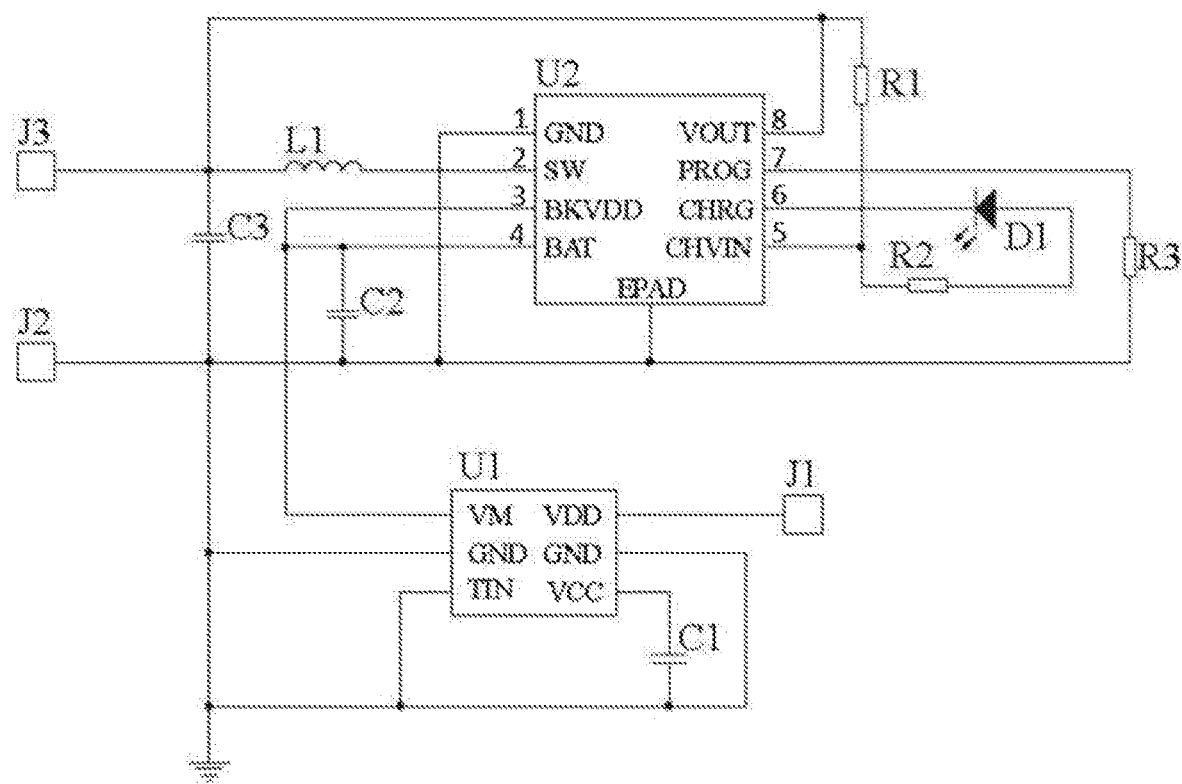
FIG. 7 is a circuit diagram of embodiment 1.

FIG. 7 shows an integrated IC, that is, U2 (model XS5301), a first resistor R1 (specification: 0.4 ohm±1%), a second resistor R2 (specification: 1K±1%), a third resistor R3 (specification: 0.9 K±1%), an inductor L1 (model 2.2 uH/3 A), an LED lamp D1 (model HL0402USR), a first capacitor C1 (specification: 0.1 uF, 10V), a second capacitor C2 (specification: 22 μF, 10V), a third capacitor C3 (specification: 22 μF, 10V), a protection IC, that is, U1 (model CT2105), as well as a first port J1, a second port J2, and a third port J3. The port J1 and the port J2 respectively represent ports electrically connected to the positive electrode lead wire 8 and the negative electrode lead wire 4 of the rechargeable cell 9; the port J3 represents the metal cap 1; and the port J3 is both a charge input port and a discharge output port; that is, the port J3 is the same port for charging and discharging.

In the embodiment, the protection IC, that is, U1 (model CT2105), has the function of battery charge and discharge process protection, mainly including: overcharge protection (the overcharge detection voltage is 4.275±0.050V, the overcharge release voltage is 4.075±0.025) V, and the overcharge voltage detection delay time is 0.96-1.40 s), overdischarge protection (the overdischarge detection voltage is 2.500±0.050V, the overdischarge release voltage is 2.900±0.025V, and overdischarge voltage detection delay time is 115-173 mS), overcharge current protection (the overcharge current for detection is 2.1-3.9 A, the overcharge current detection delay time is 8.8-13.2 mS), overdischarge current protection (the overdischarge current for detection is 2.5-4.5 A, and the overdischarge current detection delay time is 8.8-13.2 mS), and short circuit protection (the load short circuit detection voltage is 1.20-1.30V, the load short circuit detection delay is 288-432 μS).

In the embodiment, the integrated IC, that is, U2 (model XS5301), has the function of battery charge management, charge process protection, and constant voltage output, mainly including: charge management (the adapter voltage input is 4.5V-6.5V, the IC can provide a charge voltage of 4.2 V±1% to charge the battery; the maximum charge current 1C can reach 700 mA; the magnitude of the charge current is set by the third resistor R3 in FIG. 7, and the maximum charge current in the embodiment corresponding to R3=0.9K is 694 mA; charging is cut off when the charge current is reduced to 0.1 C), charge protection (a trickle charge mode is adopted when the battery voltage is lower than 2.9V; overcurrent protection, short circuit protection, and temperature protection are provided during charging), a constant voltage output (an output operation is carried out at a constant frequency of 1.5 MHz, and can be performed at a maximum current of 2 A; the constant output voltage is 1.55V; overcurrent protection, short circuit protection, temperature protection, and low voltage lock protection are provided).

Figure 8:
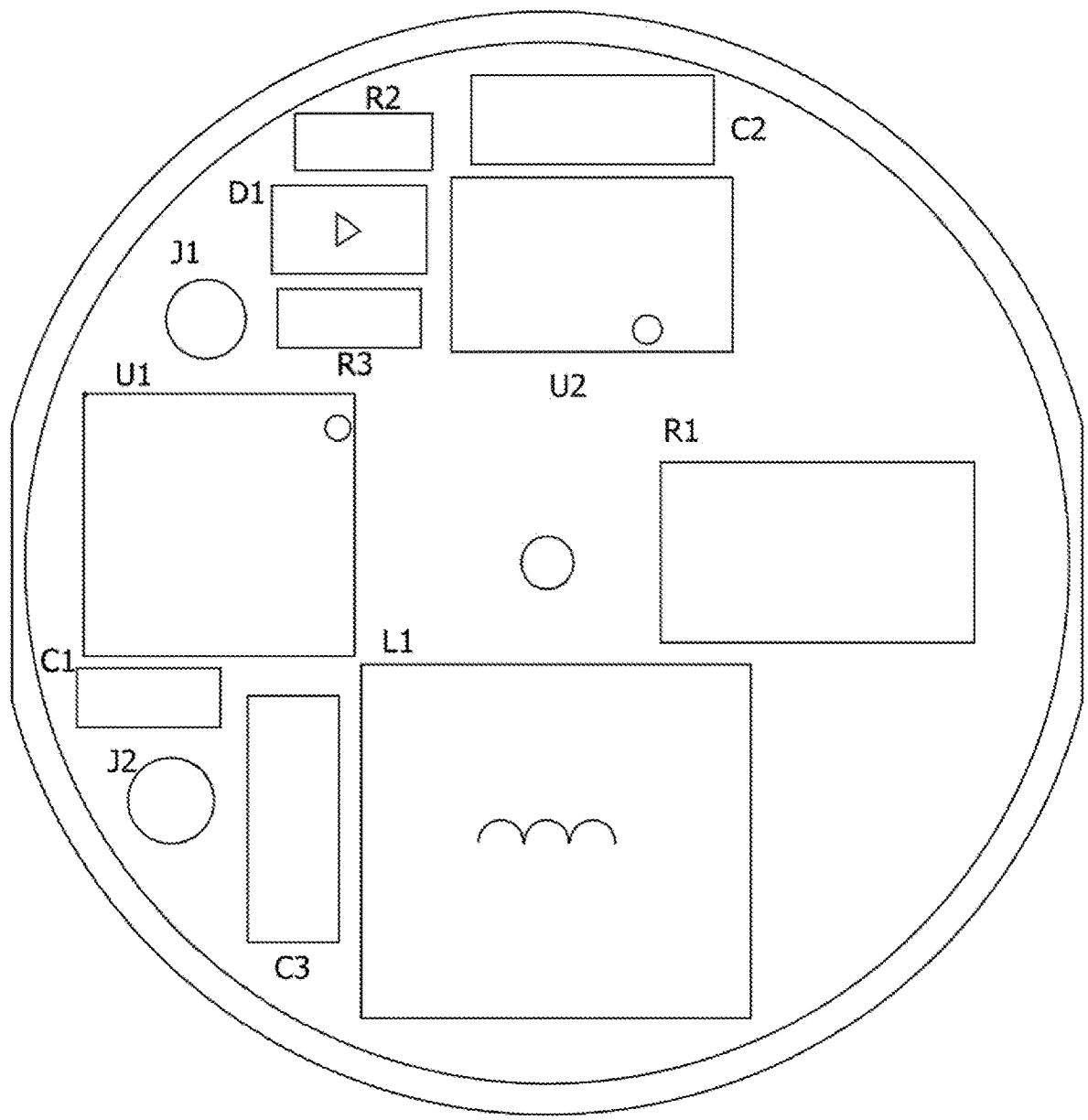
FIG. 8 is a schematic diagram of surface-mounted positions of components on a side A of the circular rigid FR-4 substrate in embodiment 1.
Figure 9:
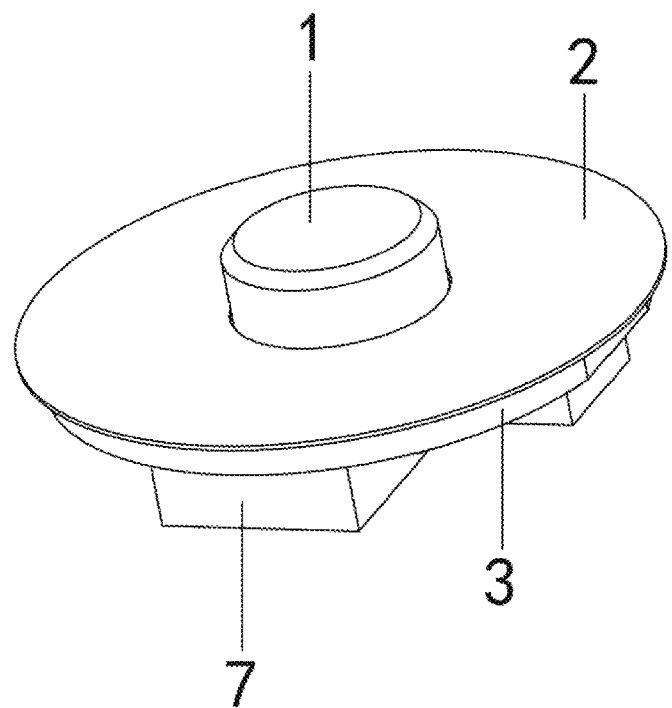
FIG. 9 is an assembly structure diagram of the metal cap, the insulation pad and a circular PCB in embodiment 1.

As shown in FIG. 8A, the following components are soldered to the side A of the circular rigid FR-4 substrate 3 in a surface-mounted manner: the first capacitor C1, the second capacitor C2, the third capacitor C3, the protection IC, that is, U1, the integrated IC, that is, U2, the first resistor R1, the second resistor R2, the third resistor R3, the inductor L1, and the LED lamp D1. In the embodiment, the highest component on the side A of the circular rigid FR-4 substrate 3 is the inductor L1, which has a height YJmax of 1.80 mm, and there are two ports, namely the first port J1 and the second port J2, and the two ports are both provided with pads for a soldering operation. The port J1 and the port J2 respectively represent ports that can be electrically connected to the positive electrode lead line 8 and the negative electrode lead line 4 of the rechargeable cell 9. The metal cap 1 is soldered to the side B of the circular rigid FR-4 substrate 3 through the port J3, and the port J3 is both a charge input port and a discharge output port; that is, the port J3 is the same port for charging and discharging.

Structural feature dimensions of the metal cap in the embodiment satisfy: M2 (=0.5 mm)<M1 (=4.5 mm)<GW (=13.9 mm) and 0.2 mm≤M2≤1 mm; the height H2 satisfies: 0.5 mm≤H2 (=0.5 mm)<YH (=0.7 mm), wherein YH is the thickness of the circular rigid FR-4 substrate and GW is the outer diameter of the steel shell. The setting of lower limit of M2, that is, 0.2 mm≤M2, can ensure the metal cap has certain strength and can well support a pressing contact force from the outside; and the setting of the upper limit of M2, that is, M2≤1 mm, can reduce an internal space of the battery occupied by the metal cap, thereby leaving more space for the side A of the circular rigid FR-4 substrate to arrange circuit components. The setting of the lower limit of the height H2, that is, 0.5 mm≤H2, allows a certain length of the metal cap to project into the corresponding hole of the circular rigid FR-4 substrate, thereby enhancing the assembly firmness of the metal cap and the circular rigid FR-4 substrate, especially improving the anti-stripping ability of the metal cap under the action of a transverse shearing external force (such as when the battery is put into a battery compartment or a charger compartment, or when the battery is taken out from the battery compartment or the charger compartment); the setting of the upper limit of the height H2, that is, H2<YH, can ensure the second cylindrical body of the metal cap does not protrude to the side A of the circular rigid FR-4 substrate, thereby avoiding the second cylindrical body of the metal cap potentially interferes with the components (surface mounted on the side A of the circular rigid FR-4 substrate), thus being conducive to installation, surface-mounting, soldering and other operations.

The key structural feature dimensions of the plastic part in the embodiment satisfy: the outer diameter SD1 (=13.90 mm) of the first cylindrical tensile body of the plastic part is equal to the outer diameter GW (=13.9 mm) of the steel shell; and the wall thickness SDB1 (=(SD1−SD2)/2= (13.90−12.80)/2=0.55 mm) of the first cylindrical tensile body satisfies 0.5 mm≤SDB1 (=0.55 mm)≤1 mm, i.e. 0.5 mm≤SDB1 (=0.55 mm)≤1 mm (if the thickness SDB1 is too small, the strength is not enough, so SDB1 is greater than or equal to 0.5 mm; and if the thickness SDB thickness is too large, it occupies the space in the diameter direction of the battery, which can reduce the effective surface-mounted area of the circular rigid FR-4 substrate and is not conducive to the arrangement and surface-mounting of the components, so SDB1 is smaller than or equal to 1 mm). The height SJ1 (=0.70 mm) of the first cylindrical tensile body of the plastic part is equal to the thickness YH (=0.70 mm) of the circular rigid FR-4 substrate, that is, SJ1=YH, and the dimensional setting can achieve that after the circular rigid FR-substrate is mounted into the plastic part, the side B of the circular rigid FR-4 substrate is flush with the outer surface of the first cylindrical tensile body of the plastic part.

The inner diameter SD3 of the second cylindrical tensile body of the plastic part in the embodiment satisfies: 0.3 mm≤SD2−SD3 (=12.8−11.9=0.9 mm)≤2 mm Due to SD2>SD3, a support platform can be formed at a joint part of the second cylindrical tensile body and the first cylindrical tensile body of the plastic part, and the support platform has two functions: firstly, supporting the circular rigid FR-4 substrate, and secondly, providing a plane to coat an adhesive, thereby bonding and fixing the circular rigid FR-4 substrate and the plastic part at the support platform. The upper limit of the inner diameter SD3 of the second cylindrical tensile body of the plastic part, that is, 0.3 mm≤SD2−SD3, is set in full consideration of the functional implementation of the support platform, which requires a certain support area, and if the area of the support platform is too small, the supporting force is insufficient and the adhesive force is also insufficient. The lower limit of the inner diameter SD3 of the second cylindrical tensile body of the plastic part, that is, SD2−SD3≤2 mm, is set in full consideration that if the area of the support platform is too large, the effective surface-mounted area of the side A of the circular rigid FR-4 substrate can be greatly reduced, which is not conducive to the arrangement and surface-mounting of the components. The height SJ2 (=0.30 mm) of the second cylindrical tensile body of the plastic part satisfies: HD/2 (=0.3/2=0.15 mm)≤SJ2 (=0.3 mm)≤1 mm, wherein HD is the height of the surface-mounted LED lamp. The setting of the lower limit of the height of the second cylindrical tensile body of the plastic part, that is, HD/2≤SJ2, can achieve that light of the LED lamp can be transmitted through the wall surface of the second cylindrical tensile body of the plastic part, and if the height SJ2 is too small, the transmission effect of the light of the LED lamp is not good. The upper limit of the height of the second cylindrical tensile body of the plastic part, that is, SJ2≤1 mm, is set in full consideration of saving the space required for parts that do not contribute to the capacity, and minimizing the height space of the battery occupied by the plastic part, thereby leaving the saved height space to the cell, which is conducive to a large capacity of the battery.

The outer diameter SD4 (=13.5 mm) of the third cylindrical tensile body of the plastic part in the embodiment of the present invention is equal to the inner diameter GN (=13.5 mm) of the steel shell, that is, SD4=GN. The height SJ3 (=2 mm) of the third cylindrical tensile body of the plastic part satisfies: 1.5 mm≤SJ3 (=2 mm), and YJmax (=1.8 mm)≤SJ3 (=2 mm)≤YJmax+1 mm (=1.8+1=2.8 mm), wherein YJmax is the maximum height of the surface-mounted components on the side A of the circular rigid FR-4 substrate. 1.5 mm≤SJ3 is set to meet the requirement that the third cylindrical tensile body of the plastic part projects into the steel shell, and the adhesive is applied to a joint part of the third cylindrical tensile body of the plastic part in the height direction and the steel shell to bond and fix them, or the steel shell is punched with a recess and embedded in the joint part of the third cylindrical tensile body of the plastic part in the height direction and the steel shell to implement fixation, and if SJ3 is too small, then the adhesive force at the joint part is insufficient or the punched recess is difficult to operate, thereby causing weak fixation. The limitation of YJmax≤SJ3 achieves that all the components on the side A of the circular rigid FR-4 substrate are accommodated inside the third cylindrical tensile body of the plastic part, thereby avoiding the short circuit risk caused by contact between the components on the side A of the circular rigid FR-4 substrate and the inner wall surface of the steel shell, which is beneficial to the improvement of reliability. SJ3≤YJmax+ mm is set in full consideration of saving the space required for parts that do not contribute to the capacity, and minimizing the height space of the battery occupied by the plastic part, thereby leaving the saved height space to the rechargeable cell, which is conducive to a large capacity of the battery.

Key feature dimensions of the circular rigid FR-4 substrate in the embodiment satisfy: the radius YB of the circular rigid FR-4 substrate is:

$$\frac{SD2}{2} - 0.1 \text{ mm } ( = 12.8/2 - 0.1 = 6.3 \text{ mm}) \leq$$

$$YB ( = 6.3 \text{ mm}) \leq \frac{SD2}{2} ( = 6.4 \text{ mm});$$

the dimensional setting can well achieve that the circular rigid FR-4 substrate is mounted inside the first cylindrical tensile body of the plastic part, and is supported by the support platform formed at the joint part of the second cylindrical tensile body and the first cylindrical tensile body of the plastic part; if YB is too small, the circular rigid FR-4 substrate has too small a diameter to form a good support at the support platform formed at the joint part of the second cylindrical tensile body and the first cylindrical tensile body of the plastic part; and if the YB is too large, that is, $$YB > \frac{SD2}{2},$$

the circular rigid FR-4 substrate has too large a diameter to be mounted inside the first cylindrical tensile body of the plastic part. The center hole of the circular rigid FR-4 substrate satisfies: M2 (=0.5 mm)<d1 (=0.6 mm)≤1 mm; the setting of the dimensional lower limit, that is, M2<d1, can well achieve the second cylindrical body of the metal cap can be inserted into the center hole of the circular rigid FR-4 substrate to accomplish assembly; and the setting of the dimensional upper limit, that is, d1≤1 mm, also allows the side A of the circular rigid FR-4 substrate to have more space for arrangement and surface mounting. The thickness of the circular rigid FR-4 substrate satisfies 0.4 mm≤YH (=0.7 mm)≤1 mm; if the thickness is too small, the strength of the circular rigid FR-4 substrate is insufficient, causing severe deformation or even breaking of the circular rigid FR-4 substrate when the metal cap is subjected to a contact pressure; and if the thickness is too large, the circular rigid FR-4 substrate occupies more height space of the battery, which is not conducive to saving more height space to the cell, and thereby not conducive to a large capacity of the battery.

The key feature dimensions of the insulation pad in the embodiment satisfy: the thickness of the insulation pad satisfies 0.1 mm≤MDH (=0.15 mm)≤0.3 mm; if the thickness of the insulation pad is too small, the insulation pad has poor friction or tension resistance, and thus is susceptible to damage, and the insulating and protective layer cannot be well achieved; and if the thickness of the insulation pad is too large, the insulation pad occupies more height space of the battery, which is not conducive to a large capacity of the battery. The diameter of the insulation pad satisfies: 2×YB (=2×6.3=12.6 mm)<MD1 (=13.50 mm)≤SD1 (=13.9 mm) mm, to ensure that the insulation pad can fully cover the side B of the circular rigid FR-4 substrate. The diameter of the circular hole of the insulation pad satisfies: M1 (=4.5 mm)<MX (=4.6 mm)≤M1+0.2 mm (=4.7 mm), wherein the setting of M1<MX can achieve that the first cylindrical body of the metal cap can completely pass through the circular hole of the insulation pad without interference, and the setting of MX≤M1+0.2 further ensures that the insulation pad fully covers the side B of the circular rigid FR-4 substrate B substrate.

The insulation heat shrink film in the embodiment is an insulating film which shrinks by heat, is made of PVC or PET, and has the function that being wrapped around the outer side of the steel shell, it gets stuck to the steel shell after shrinking, thus achieving insulation and fixing the insulation pad. The key feature dimensions of the insulation heat shrink film in the embodiment satisfy: the thickness RH of the insulation heat shrink film satisfies 0.05 mm≤RH (=0.10 mm)≤0.2 mm; if the thickness is too small, it is susceptible to damage, and its functions of insulation and fixing the insulation pad cannot be well achieved; and if the thickness of the insulation heat shrink film is too large, the total diameter of the secondary battery exceeds the standard specification. The upper wrapping diameter RS of the insulation heat shrink film satisfies: SD1−6.0 (=13.9−6=7.9 mm) mm≤RS (=10.5 mm)≤SD1−0.5 mm (=13.9−0.5=13.4 mm); the setting of RS≤SD1−0.5 can achieve effective wrapping and fixing of the insulation pad by the insulation heat shrink film; and SD1−6.0 mm≤RS takes into account that if too much is wrapped when the insulation heat shrink film heat shrinks actually, the heat shrink is prone to be irregular. The lower wrapping diameter RX of the insulation heat shrink film satisfies: GW−5.0 mm (=13.9−5=8.9 mm)≤RX (=11.90)≤GW (=13.9 mm) mm, and the setting of RX≤GW can achieve effective wrapping of the lateral side of the steel shell of the battery by the insulation heat shrink film; GW−5.0 mm≤RX takes into account that if too much is wrapped when the insulation heat shrink film heat shrinks actually, the heat shrink is prone to be irregular, and this is also not conducive to contact between the bottom of the steel shell and an external electrical appliance or terminal.

The maximum height DXGmax of the rechargeable battery of the embodiment satisfies:

$$DXGmax \leq H-H1-SJ1-SJ2-SJ3-GKDH\ (=50.5-1.7-0.7-0.3-2-0.5=45.3\ \text{mm}),$$

wherein H is the total height of the secondary battery, H1 is the height of the first cylindrical body of the metal cap, SJ1 is the height of the first cylindrical tensile body of the plastic part, SJ2 is the height of the second cylindrical tensile body of the plastic part, SJ3 is the height of the third cylindrical tensile body of the plastic part, and GKDH is the thickness of the bottom of the steel shell including the bottom boss.

Referring to FIGS. 1 to 9, in the actual fabrication of the embodiment, the following steps are carried out:

(1) First, surface mounted soldering is performed on a side A and a side B of a circular rigid FR-4 substrate, wherein a first capacitor C1, a second capacitor C2, a third capacitor C3, a protection IC, that is, U1, an integrated IC, that is, U2, a first resistor R1, a second resistor R2, a third resistor R3, an inductor L1 and an LED lamp D1 are soldered to the side A in a surface-mounted manner; a metal cap is soldered to the side B in a surface-mounted manner, and a second cylindrical body of the metal cap is inserted into a center hole of the circular rigid FR-4 substrate, wherein the circular rigid FR-4 substrate with the components soldered thereon in a surface-mounted manner is called a circular PCB.

(2) An adhesive is applied to a support platform formed at a joint part of a second cylindrical tensile body and a first cylindrical tensile body of a plastic part, and to the inner wall surface in the height direction of the first cylindrical tensile body of the plastic part, and the circular PCB is mounted inside the first cylindrical tensile body of the plastic part with the side A facing downward and the side B facing upward, and is press-fit to the support platform, and after the adhesive is cured, the circular PCB is bonded and fixed to the plastic part.

(3) A positive electrode lead wire (which may be a nickel strip, a nickel-plated steel strip, or a conducting wire) is welded at a positive terminal of a rechargeable cell, and a negative electrode lead wire (which may be a nickel strip or a nickel-plated steel strip) is welded at a negative terminal of the rechargeable cell, and then the rechargeable cell is placed into a steel shell, and the negative electrode lead wire of the rechargeable cell is electrically connected to the steel shell (by soldering, press-fitting, electric resistance welding, laser welding, or the like).

(4) The positive electrode lead wire of the rechargeable cell is connected to a first pad of the side A of the circular rigid FR-4 substrate (if the positive electrode lead wire of the rechargeable cell is a conducting wire or a nickel strip or a nickel-plated steel strip, soldering connection can be adopted; and if the positive electrode lead wire of the rechargeable cell is a nickel strip or a nickel-plated steel strip, it is also possible that the nickel sheet or the nickel-plated steel sheet is surface mounted to the first pad on the side A of the circular rigid FR-4 substrate, and then, the positive electrode lead wire of the rechargeable cell is connected to the first pad of the side A of the circular rigid FR-4 substrate by resistance welding or laser welding); and the negative electrode lead wire of the rechargeable cell is connected to a second pad on the side A of the circular rigid FR-4 substrate, in which soldering connection can be adopted, and it is also possible that a nickel sheet or a nickel-plated steel sheet is surface mounted to the second pad on the side A of the circular rigid FR-4 substrate, and then, the negative electrode lead wire of the rechargeable cell is connected to the second pad of the side A of the circular rigid FR-4 substrate by resistance welding or laser welding.

(5) A third cylindrical tensile body of the plastic part is inserted into the steel shell, and then a joint part of the third cylindrical tensile body and the steel shell of the plastic part and the steel shell is punched by a steel pin, and the steel shell is deformed under force and embedded into the third cylindrical tensile body of the plastic part, thus achieving fixation of the plastic part and the steel shell; or an adhesive is applied to the inner wall surface of the steel shell at a joint part of the third cylindrical tensile body of the plastic part and the steel shell, and then, the third cylindrical tensile body of the plastic part is inserted into the steel shell, and the adhesive is cured to accomplish the bonding and fixing of the plastic part and the steel shell.

(6) A circular hole of an insulation pad is sleeved on a first cylindrical body of the metal cap, and the insulation pad is adhered to the side B of the circular rigid FR-4 substrate, and finally an insulation heat shrink film heat shrinks the insulation pad, the plastic part and the steel shell successively together.

In this way, the fabrication of the cylindrical large-capacity secondary battery integrating multiple functions of charge management, constant voltage output, and charge and discharge protection is accomplished.

Figure 10:
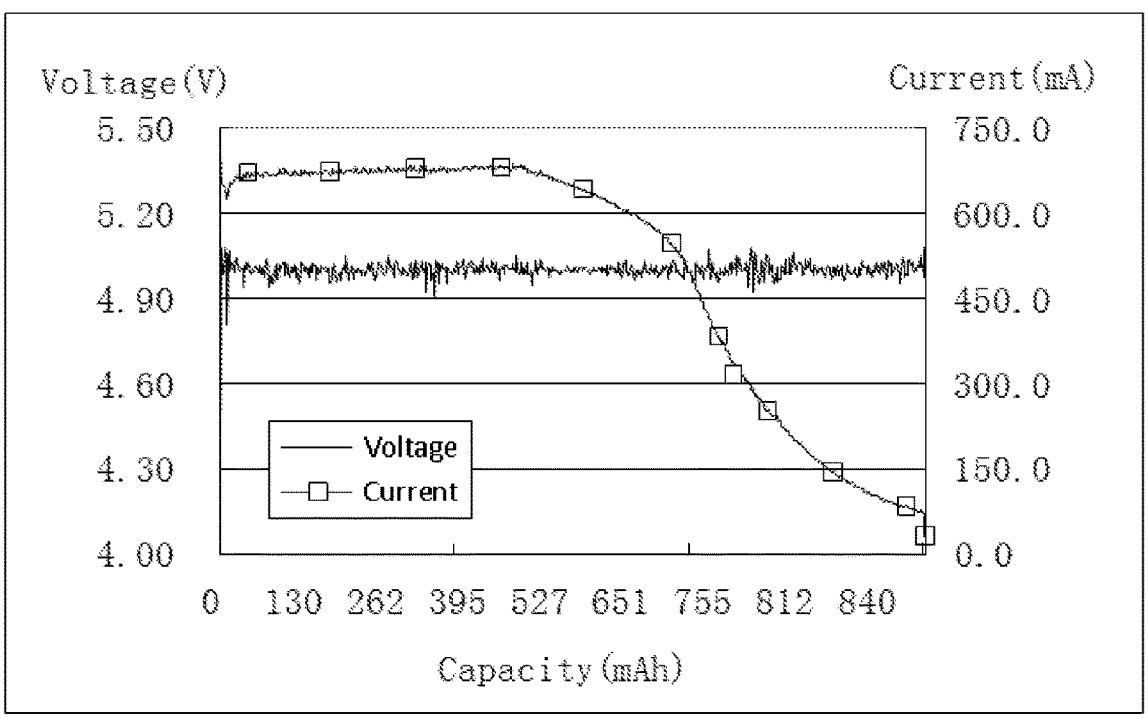
FIG. 10 is a charge voltage-charge current-charge capacity relationship diagram of the large-capacity secondary battery in embodiment 1.

After the large-capacity secondary battery in the embodiment is completely discharged, the adapter specification is: a constant voltage output of 5V, and a maximum charge current of 700 mA, for charging the secondary battery, the total charge capacity being 853.1 mAh, and its charge voltage-charge current-charge capacity relationship diagram is shown in FIG. 10. During the charge process, charge management and charge protection are carried out by the circuitry inside the battery.

Figure 11:
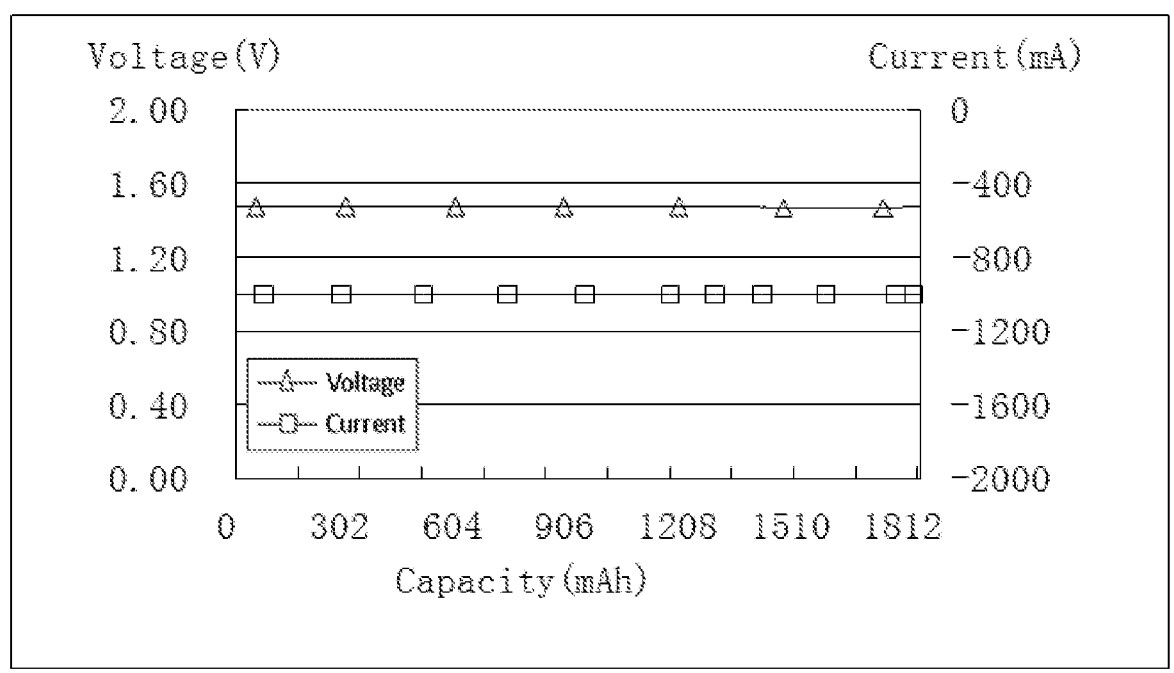
FIG. 11 is a discharge voltage-discharge current-discharge capacity relationship diagram of the large-capacity secondary battery in embodiment 1.

The fully charged battery is discharged at a constant current of 1000 mA, with a cut-off voltage of 1.0 V. Its discharge voltage-discharge current-time relationship diagram is shown in FIG. 11, wherein the discharge voltage of the secondary battery is 1501 mV to 1473 mV, stable within the range of 1.50±0.10V, thereby achieving the function of a constant voltage output with a current of 1.0 A, and the discharge capacity of the whole discharge process is 1836 mAh. At the end of the discharge, the discharge voltage suddenly drops to 0.03 V, and the current is 0 mA, indicating that an overdischarge protection condition is triggered, and the discharge circuit is turned off, thus achieving the discharge protection function.

In a method of the prior art, for a battery with the size of the same model, i.e. model R6S, as structural parts occupy more than a space of about 2 mm height in the embodiment, it can only use a polymer lithium-ion battery with a smaller height, generally of the model 13430 (with a diameter of 13.00±0.20 mm, and a height of $43.00^{+0}_{-1.0}$ mm), with a nominal voltage of 3.7V, and a capacity of 780 mAh. That is, the technical method of the embodiment can achieve a capacity of 9% higher than the prior art.

It should be noted that although the embodiment is described by using a lithium-ion battery with a constant step-down voltage output of 1.50V as an example, it is also applicable to a working condition in which a secondary battery needs a constant step-up voltage output, for example, a lithium-ion battery with a constant voltage output of 9V, etc.

It should be noted that although the embodiment is described with the size of the model R6S, it is also applicable to batteries of other sizes.

Embodiment 2

A large-capacity secondary battery has a structure similar to that of the large-capacity secondary battery of embodiment 1, with differences in that a constant output voltage is 1.50V and the specification of a third resistor R3 is 1.25 K±1%, and the maximum charge current corresponding to the secondary battery is 500 mA.

1. Described above are preferred embodiments of the present invention, and it should be noted that to those of ordinary skill in the art, a number of improvements and modifications may also be made without departing from principles of the present invention, and these improvements and modifications should also be encompassed within the protection scope of the present invention.

The invention claimed is:

1. A large-capacity secondary battery, comprising:
  a rechargeable cell,
  a steel shell,
  a protection IC,
  an integrated IC,
  resistors,
  capacitors,
  an inductor,
  a LED lamp,
  a plastic part,
  a circular rigid FR-4 substrate,
  a metal cap,
  an insulation pad, and
  an insulation heat shrink film, for integrating multiple functions of a constant voltage output, charge management and protection, and overcharge, overdischarge and overcurrent protection,
  wherein the protection IC, the integrated IC, the resistors, the capacitors, the inductor and the LED lamp are soldered on a side A of the circular rigid FR-4 substrate in a surface-mounted manner;
  the metal cap is soldered on a side B of the circular rigid FR-4 substrate;
  the insulation pad is sleeved on the metal cap;
  the circular rigid FR-4 substrate is mounted within the plastic part with the side B facing upward, and a first cylindrical body of the metal cap partially going beyond a top end of the plastic part;
  a lower end of the plastic part is sleeved at an open end of the steel shell in a mating manner;
  the rechargeable cell is placed inside the steel shell;
  a positive electrode terminal and a negative electrode terminal of the rechargeable cell are correspondingly connected to a first pad and a second pad of the side A of the circular rigid FR-4 substrate through a positive electrode lead wire and a negative electrode lead wire respectively;
  the insulation heat shrink film heat shrinks the insulation pad, the plastic part and the steel shell successively together;
  the circular rigid FR-4 substrate serves as a surface-mounted soldering substrate for the metal cap and other components, and also as an upper support end face and closure end face of the battery;

the plastic part has three concentric cylindrical tensile bodies, to serve as a support body for the circular rigid FR-4 substrate, a transmission body for the LED lamp, an insulation protective body for surface-mounted soldered components on the side B of the circular rigid FR-4 substrate, and a structural body for connection and fixation to the steel shell;

the insulation pad serves as an insulating layer and a protective layer for the side B of the circular rigid FR-4 substrate, to avoid possible damage of a solder mask layer and exposure of a copper foil due to scratching of the side B of the circular rigid FR-4 substrate by an external object;

the function multiplex, three-dimensional space layout and assembly form of the three parts including the circular rigid FR-4 substrate, the plastic part and the insulation pad greatly reduce the space occupied by structural parts that do not contribute to the capacity, to achieve a large capacity; and the plastic part includes a first cylindrical tensile body, a second cylindrical tensile body and a third cylindrical tensile body, the first cylindrical tensile body, the second cylindrical tensile body and the third cylindrical tensile body being coaxial, the first cylindrical tensile body being joined with the second cylindrical tensile body in an up-down direction with outer walls thereof being flush with each other, and the top of the second cylindrical tensile body extending beyond an inner wall of the first cylindrical tensile body to form a support platform, and the third cylindrical tensile body being joined with the second cylindrical tensile body in the up-down direction with inner walls thereof being flush with each other;

the FR-4 substrate is bonded and fixed to the plastic part by an adhesive applied to the support platform and the inner wall in the height direction of the first cylindrical tensile body of the plastic part;

the plastic part is bonded and fixed to the steel shell by the adhesive applied to an inner wall surface of the steel shell at a joint part of the third cylindrical tensile body of the plastic part and the steel shell;

the plastic part satisfies 0.3 mm≤SD2−SD3≤2 mm, and HD/2≤SJ2≤1 mm, wherein HD is a height of the surface-mounted LED lamp, SD2 is an inner diameter of the first cylindrical tensile body of the plastic part, SD3 is an inner diameter of the second cylindrical tensile body of the plastic part, and SJ2 is a height of the second cylindrical tensile body of the plastic part, all in mm.

2. The large-capacity secondary battery of claim 1, wherein the metal cap satisfies M2<M1<GW, 0.2 mm≤M2≤1 mm, and 0.5 mm≤H2<YH, wherein M1 is a diameter of the first cylindrical body of the metal cap, M2 is a diameter of a second cylindrical body of the metal cap, GW is an outer diameter of the steel shell, H2 is a height of the second cylindrical body of the metal cap, and YH is a thickness of the circular rigid FR-4 substrate, all in mm.

3. The large-capacity secondary battery of claim 2, wherein the metal cap comprises the first cylindrical body and the second cylindrical body, an upper end surface of the first cylindrical body being a chamfered structure, and the first cylindrical body being a structural part for the secondary battery to contact an external load or charging power source; and the second cylindrical body being coaxial with the first cylindrical body, and a top surface of the second cylindrical body being coplanar with a bottom surface of the first cylindrical body.

4. The large-capacity secondary battery of claim 1, wherein the plastic part satisfies 1 mm≤SD1−SD2≤2 mm, 5 mm≤SJ3, and Yjmax≤SJ3≤YJmax+1 mm, wherein SD1 is an outer diameter of the first cylindrical tensile body of the plastic part, SD2 is the inner diameter of the first cylindrical tensile body of the plastic part, SJ3 is a height of a third cylindrical tensile body of the plastic part, and YJmax is the largest height of a surface-mounted component of the side A of the circular rigid FR-4 substrate, all in mm.

5. The large-capacity secondary battery of claim 1, wherein the circular rigid FR-4 substrate satisfies SD2/2−0.1 mm≤YB≤SD2/2 mm, and M2<d1≤1 mm, wherein YB is a radius of the circular rigid FR-4 substrate, SD2 is the inner diameter of the first cylindrical tensile body of the plastic part, M2 is a diameter of the second cylindrical body of the metal cap, and d1 is a diameter of a center hole of the circular rigid FR-4 substrate, all in mm.

6. The large-capacity secondary battery of claim 1, wherein the insulation pad satisfies: 0.1 mm≤MDH≤0.3 mm, 2×YB<MD1≤SD1, and M1<MX≤M1+0.2 mm, wherein MDH is a thickness of the insulation pad, MD1 is a diameter of the insulation pad, MX is a diameter of a circular hole of the insulation pad, YB is a radius of the circular rigid FR-4 substrate, SD1 is an outer diameter of the first cylindrical tensile body of the plastic part, and M1 is a diameter of the first cylindrical body of the metal cap, all in mm.

7. The large-capacity secondary battery of claim 1, wherein the insulation heat shrink film satisfies 0.05 mm≤RH≤0.2 mm, MD1−6.0 mm≤RS≤MD1−0.5 mm, and GW−5.0 mm≤RX≤GWmm, wherein RH is a thickness of the insulation heat shrink film, MD1 is a diameter of the insulation pad, RS is an upper wrapping diameter of the insulation heat shrink film, RX is a lower wrapping diameter of the insulation heat shrink film, and GW is the outer diameter of the steel shell, all in mm.

* * * * *